(12) United States Patent
Hampton et al.

(10) Patent No.: US 9,857,834 B2
(45) Date of Patent: Jan. 2, 2018

(54) INFORMATION HANDLING SYSTEM HINGE AND FLEXIBLE COVER

(71) Applicant: Dell Products L.P., Round Rock, TX (US)

(72) Inventors: Patrick A. Hampton, Round Rock, TX (US); Chiu Jung Tsen, Hsinchu (TW); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/350,633

(22) Filed: Nov. 14, 2016

(65) Prior Publication Data

US 2017/0097657 A1    Apr. 6, 2017

Related U.S. Application Data

(63) Continuation of application No. 14/873,691, filed on Oct. 2, 2015, now Pat. No. 9,507,388.

(51) Int. Cl.
   *G06F 1/16*    (2006.01)
   *E05D 3/12*    (2006.01)
   *F16C 11/12*    (2006.01)

(52) U.S. Cl.
   CPC ........... *G06F 1/1616* (2013.01); *F16C 11/12* (2013.01); *G06F 1/1637* (2013.01); *G06F 1/1683* (2013.01)

(58) Field of Classification Search
   None
   See application file for complete search history.

(56) References Cited

U.S. PATENT DOCUMENTS

| | | | | |
|---|---|---|---|---|
| 5,394,297 A | * | 2/1995 | Toedter | G06F 1/1616 16/386 |
| 7,832,056 B2 | * | 11/2010 | Kuwajima | H04M 1/022 16/282 |
| 8,720,011 B1 | * | 5/2014 | Hsu | E05D 3/122 16/354 |
| 9,290,976 B1 | * | 3/2016 | Horng | G06F 1/1618 |
| 2004/0154129 A1 | * | 8/2004 | Martinez-Munoz | E05D 11/0054 16/250 |
| 2006/0002058 A1 | * | 1/2006 | Zaderej | G06F 1/1616 361/679.27 |
| 2010/0265686 A1 | * | 10/2010 | Kilpinen | G06F 1/1616 361/807 |
| 2011/0157780 A1 | * | 6/2011 | Wang | G06F 1/1681 361/679.01 |
| 2015/0047152 A1 | * | 2/2015 | Cheng | E05D 3/122 16/354 |
| 2016/0187934 A1 | * | 6/2016 | Lee | G06F 1/1618 361/679.56 |

* cited by examiner

*Primary Examiner* — Xanthia C Cunningham
(74) *Attorney, Agent, or Firm* — Terrile, Cannatti, Chambers & Holland, LLP; Robert W. Holland

(57) ABSTRACT

A portable information handling system has lid and main portions rotationally coupled to each other with a set of hinges having motion managed by rack and pinion gears. The rack translates motion between pinions by moving outward from the housing portions during rotation of the housing portions. A flexible cover over the rack stretches in response to movement of the rack to contain the hinges within the portable information handling system structure.

16 Claims, 10 Drawing Sheets

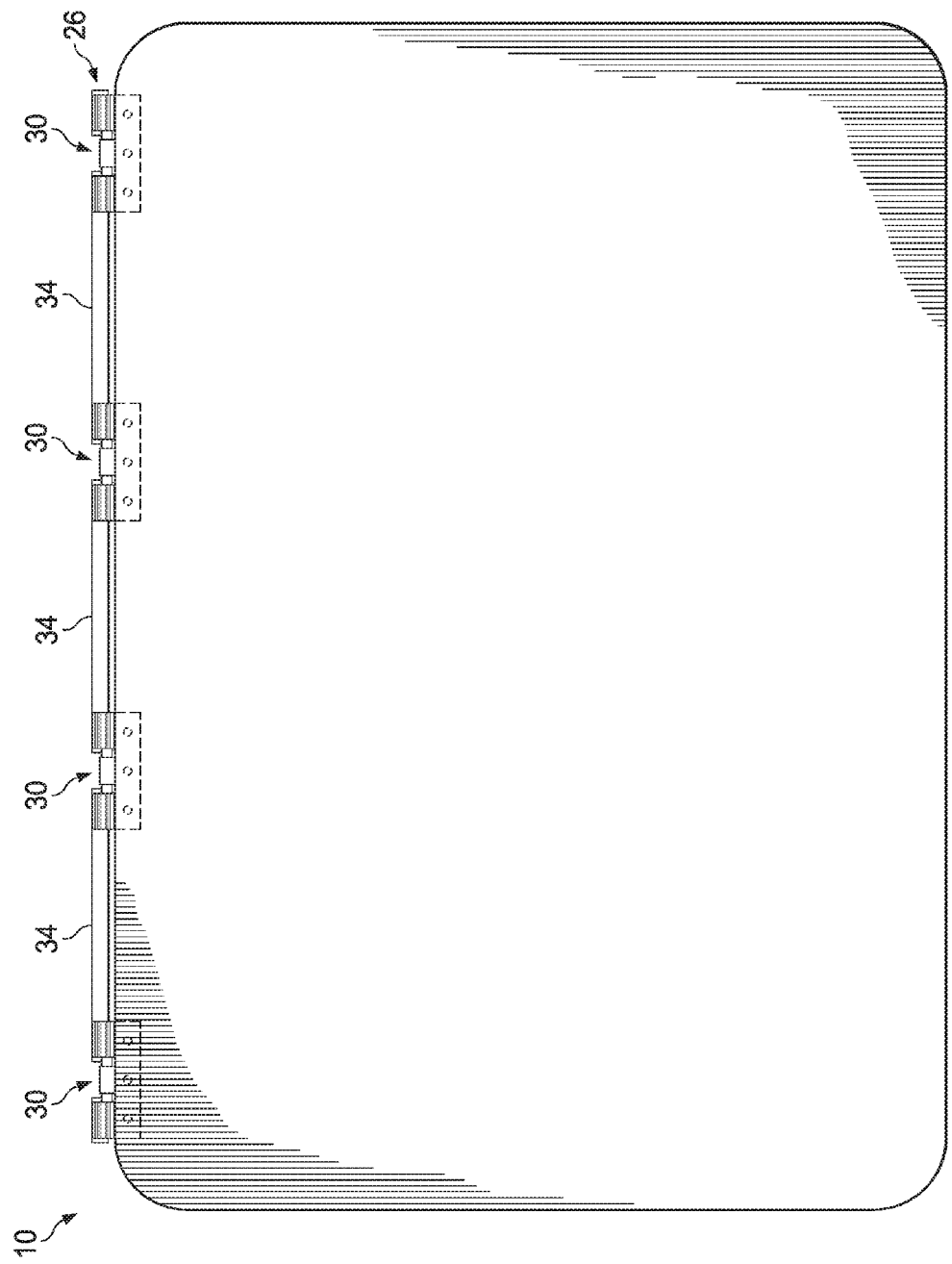

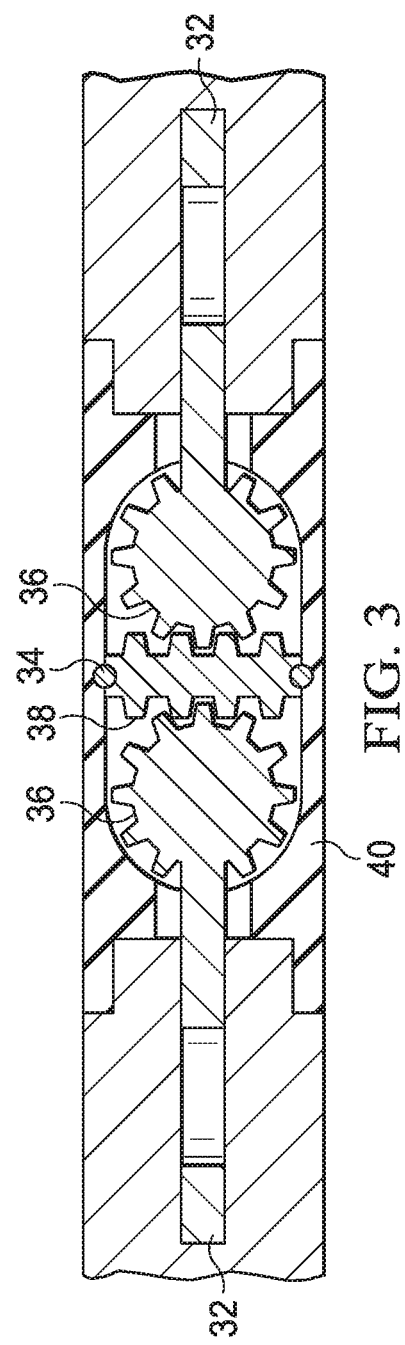

INFORMATION HANDLING SYSTEM HINGE AND FLEXIBLE COVER

CONTINUING DATA

This application is a continuation of U.S. patent application No. 14/873,691, filed Oct. 2, 2015, entitled "Information Handling System Hinge and Flexible Cover" which includes exemplary systems and methods and is incorporated by reference in its entirety.

BACKGROUND OF THE INVENTION

Field of the Invention

The present invention relates in general to the field of information handling system coupling mechanisms, and more particularly to an information handling system hinge and flexible cover.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems generally are built in small portable housings having intergrade input/output devices to accept end user inputs and an integrated power sources, such as a rechargeable battery. Tablet and smartphone information handling systems are typically built in a planar housing having a touch screen display disposed on one side that accepts inputs as touches made to the display. Laptop or convertible information handling systems typically include an integrated keyboard that accepts end user inputs to support use cases where the end user inputs greater amounts of information, such as for word processing. Typical laptop and convertible configurations have a main housing that integrates the keyboard and a rotationally-coupled lid that integrates the display. A user rotates the lid to an open position to expose the display and keyboard when in use, and closes the lid to protect the display and keyboard when not in use. in some instances, the display in the lid includes a touchscreen so that the user can also perform inputs at the display, either rotated 90 degrees to a clamshell position or rotated 360 degrees to convert into a tablet.

Generally, portable information handling systems are designed to have a thin or low height profile to enhance portable usage cases. End users tend to prefer thin profiles that fit into purses, pockets or carrying cases that allow ready access to the information handling system when on the go. Unfortunately, low profile housings tend to provide less protection to components disposed in the information handling system. Further, in order to minimize the housing size, components within the information handling system are generally selected to have a minimal size. Low profile mechanical components tend to have increased cost and reduced robustness. One example of such a mechanical component is the hinge that rotationally couples the main housing and lid. Low profile housing components for convertible information handling systems that convert into a tablet with 360 degrees of rotation of a lid housing portion relative to a main housing portion generally include a hinge that rotates about a narrow point and has a minimal space within the housing portions. Both the hinge material and the attachment devices that couple the hinge to the housing, such as screws that couple to a housing structure, are built to have a minimal thickness. Thin material designs tend to have increased flex and create increased torsion across supported components. For example, a display disposed in a lid may twist slightly when touched or rotated resulting in damage to the display material. Increased flex of housing components tends to impact longevity of electrical components over time and also lead to mechanical failure of the housing components. Further, in order to meet mechanical requirements, multiple hinges are sometimes used resulting in suboptimal cable routing and increased costs.

SUMMARY OF THE INVENTION

Therefore, a need has arisen for a system and method which provides a robust information handling system low profile hinge.

In accordance with the present invention, a system and method are provided which substantially reduce the disadvantages and problems associated with previous methods and systems for rotationally coupling information handling system components to each other. A hinge assembly is enclosed in a flexible cover that stretches as hinge components rotate housing portions relative to each other. In one embodiment, the hinge assembly includes a hinge with a rack and pinion gear to provide 360 degrees of rotation by extending the rack outward to stretch the cover as the pinions rotate with the housing portions.

More specifically, a portable information handling system processes information with processing components disposed in a housing main portion and presents the information as visual images with a display disposed in a housing lid portion. The housing main and lid portions rotationally couple to each other with a hinge assembly having plural hinges interconnected by one or more connection plates. Each hinge has a support element coupling at one end to a housing portion and terminating at the other end with a pinion gear. A rack disposed between opposing pinion gears interconnects the housing portions to translate motion of one housing portion relative to the other. As the housing portions rotate proximate to each other at zero or 360 degrees of rotation, the rack extends outward from the information handling system. A flexible sheath covers the hinge assembly to enclose the hinges. The racks of multiple hinges are interconnected by the connection plates so that the flexible cover is stretched in response to the movement of the rack to provide room for a full 360 degrees of rotation of the housing portions relative to each other.

The present invention provides a number of important technical advantages. One example of an important technical advantage is that a portable information handling system main and lid housing components are rotationally coupled to each other in a robust manner with a low profile hinge. A rigid rack and pinion gear assembly provides robust synchronized motion with secure interlocking dual gears to reduce flexion transfer to housing components. A flexible cover stretches in response to rack movement to provide an aesthetically appealing cover responsive to rack movement and minimizing hinge thickness. In addition the flexible cover provides spacing for routing of cables that communicate between the housing portions. For example, a connection plate interconnects multiple racks to coordinate movement of the housing portions by multiple hinges and to provide a cable routing platform encased by the flexible cover.

BRIEF DESCRIPTION OF THE DRAWINGS

The present invention may be better understood and its numerous objects, features and advantages made apparent to those skilled in the art by referencing the accompanying drawings. The use of the same reference number throughout the several figures designates a like or similar element.

FIG. 2 depicts a top view of a portable information handling system having the hinge assembly coupled to the housing with the flexible cover removed;

FIG. 3 depicts a side cutaway view of the portable information handling system hinge and flexible cover rotated to an open position;

DETAILED DESCRIPTION

A hinge having a rack and pinion rotationally couples housing main and lid portions of an information handling system within a flexible sheath that stretches to adapt to movement of the rack. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
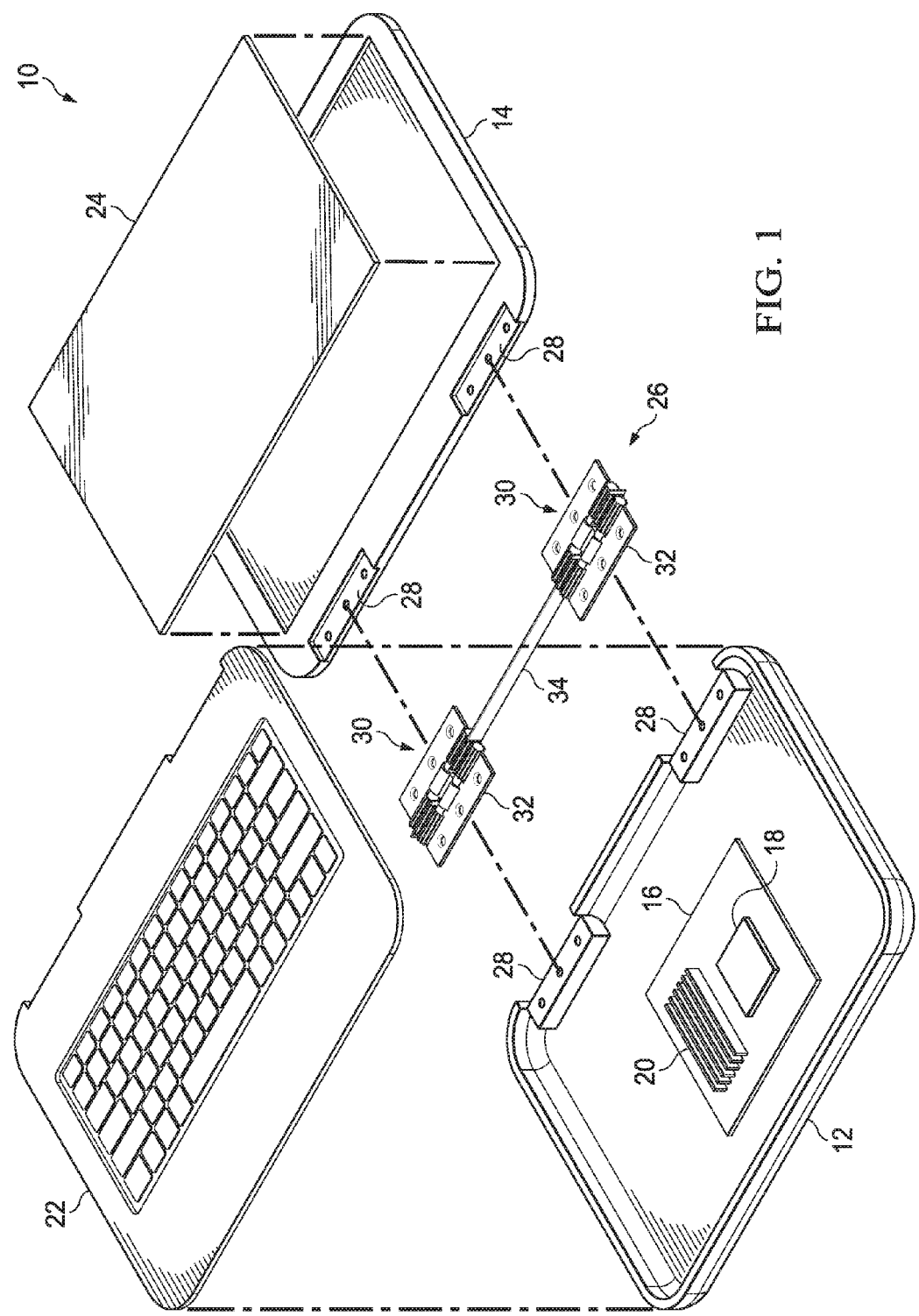
FIG. 1 depicts a blown-up view of a portable information handling. system having a hinge assembly with a flexible cover.

Referring now to Figure a blown-up view depicts a portable information handling system 10 having a hinge assembly 26 with a flexible cover. Portable information handling system 10 in the example embodiment of FIG. 1 is built with a housing main portion 12 and a housing lid portion 14. Housing main portion 12 contains processing components that process information, such as a motherboard 16 that interfaces a central processing unit (CPU) 18 and memory (RAM) 20. An integrated keyboard 22 disposed over housing main portion 12 accepts end user inputs for CPU 18, Housing lid portion 14 integrates a display 24 that interfaces with the processing components to present information as visual images. Housing main portion 12 and lid portion 14 rotationally couple with each other by a hinge assembly 26 coupled to each housing portion at hinge attachment points 28, such as with screws or other attachment devices. Hinge assembly 26 has plural hinges 30 with each hinge having a pair of opposing hinge support elements 32. Hinges 30 interconnect with a connection plate 34 that synchronizes movement of the hinges 30 relative to each other. Hinge assembly 26 is enclosed in a flexible sheath as depicted below that allows hinge elements to move in a manner that stretches the cover. Although the example embodiment depicted by FIG. 1 and below shows a convertible information handling system that rotates main and lid portions 360 degrees relative to each other, in alternative embodiments other types of portable information handling system configurations may be supported with less relative rotation, such as clamshell configurations or tablet configurations that couple to a peripheral keyboard portion.

Referring now to FIG. 2, a top view depicts a portable information handling system 10 having the hinge assembly 26 coupled to the housing with the flexible cover removed. In the closed position as depicted by FIG. 2, a rack element of hinge 30 is pressed outward from information handling system 10 to stretch the flexible cover placed over hinge 26. Connection plate 34 couples to plural racks as depicted below to provide a uniform stretching force across the length of hinge 26.

Referring now to FIG. 3, a side cutaway view depicts the portable information handling system 10 hinge 30 and flexible cover 40 rotated to an open position. Hinge support elements 32 are coupled at one end to housing portions 12 and 14 and terminate at an opposing end with a pinion gear 36. Disposed between pinion gears 36 is a rack 38 having gears on opposing sides that each engage with the gears of pinion gears 36. When a force is applied at either of housing portions 12 or 14 to rotate one housing portion relative to the other, the force transfers from the pinion gear 36 on one housing portion through rack 38 to the other pinion gear 36. As the relative angle of the housing portions changes, the position of rack 38 relative to pinion gears 36 changes. A flexible sheath cover 40, such as a rubber-type material, encloses hinge 32 including rack 38 and stretches in response to pressure by rack 38 during rotational movement. Connection plate 34 couples at each end of rack 38 where rack 38 moves against cover 40 to provide a uniform application of force across cover 40.

Figure 3A:
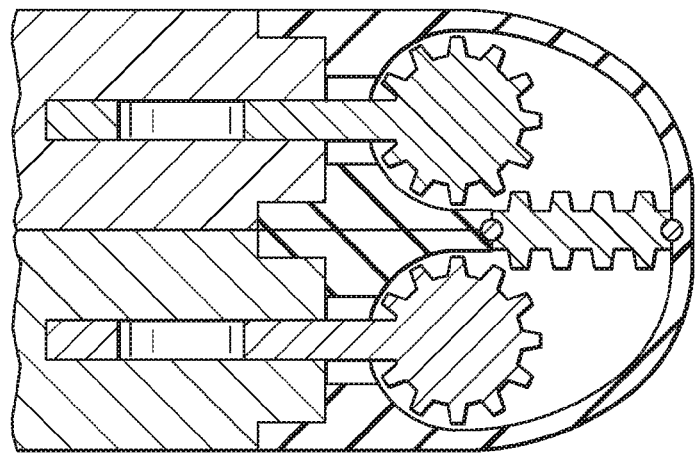
FIGS. 3A, 3B, 3C, 3D and 3E depict the portable information handling system and hinge rotated between 0 and 360 degrees.
Figure 3B:
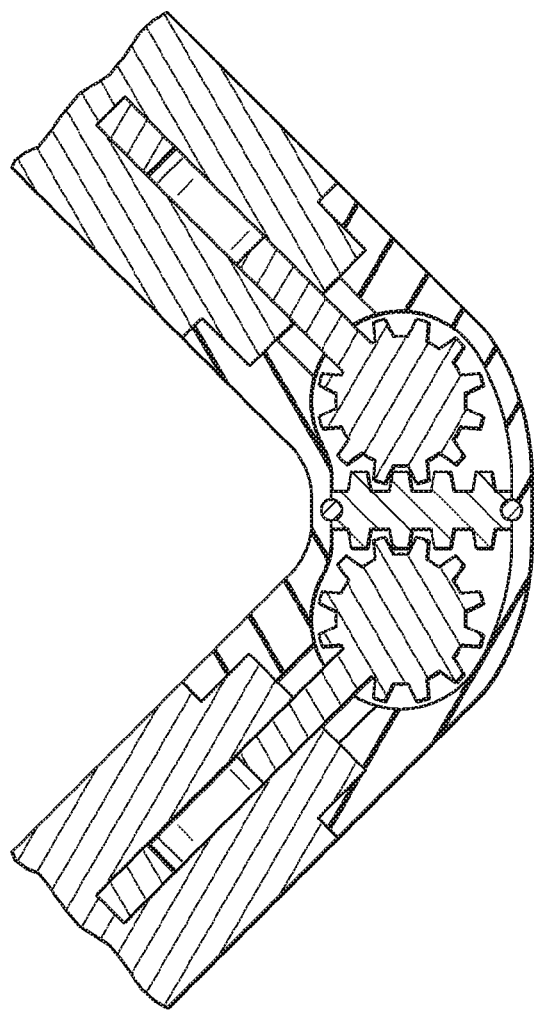
Figure 3C:
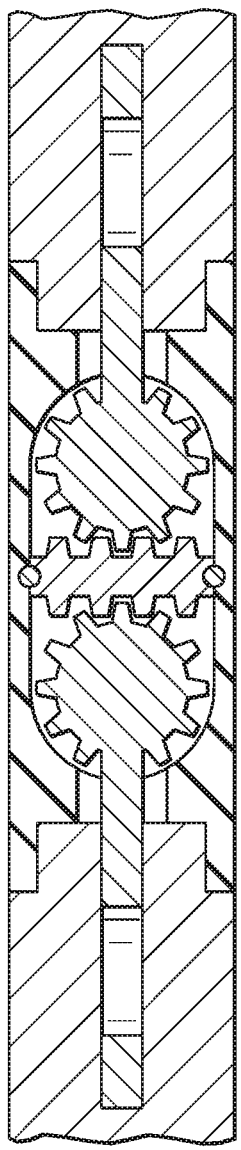
Figure 3D:
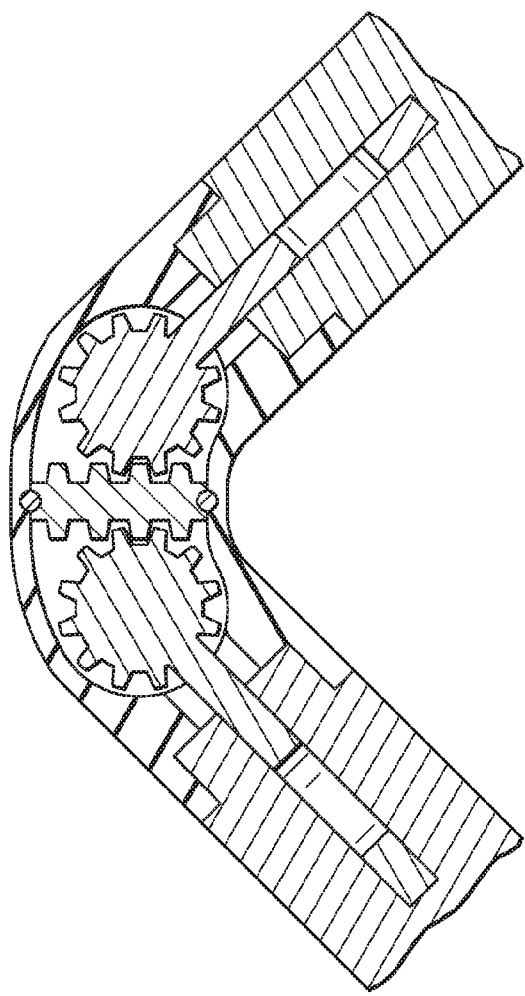
Figure 3E:
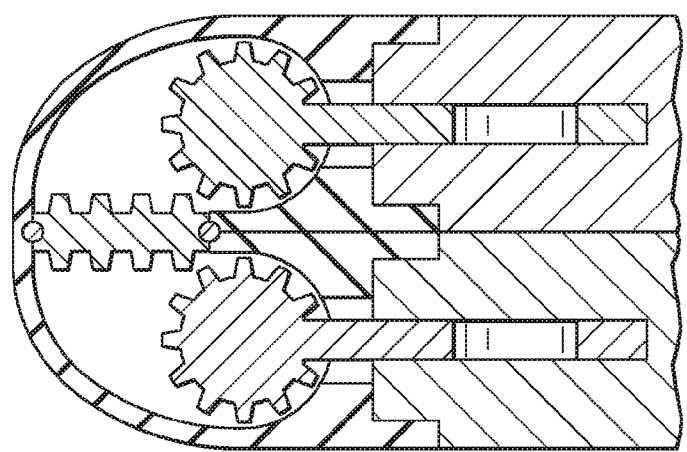

Referring now to FIGS. 3A, 3B, 3C, 3D and 3E depict the portable information handling system and hinge rotated between 0 and 360 degrees. At zero degrees depicted by FIG. 3A, rack 38 extends out the rear of information handling system 10. As the housing portions rotate to 90 degrees depicted by FIG. 3B, rack 38 engages with rotating pinions 36 to move inward towards the center of cover 40. At 180 degrees of rotation as depicted by FIG. 3C, rack 38 moves to a central position relative to pinions 36 and removing pressure placed against cover 40. At 270 degrees of rotation depicted by FIG. 3D, rack 38 moves out the opposite side of cover 40 to stretch cover 40 distal the housing portions. At 360 degrees of rotation, rack 38 is repositioned by pinions 36 to the opposite side of cover 40 and extending outwards away from information handling system 10. Cover 40 stretches to provide room for the movement of rack 38.

Figure 4:
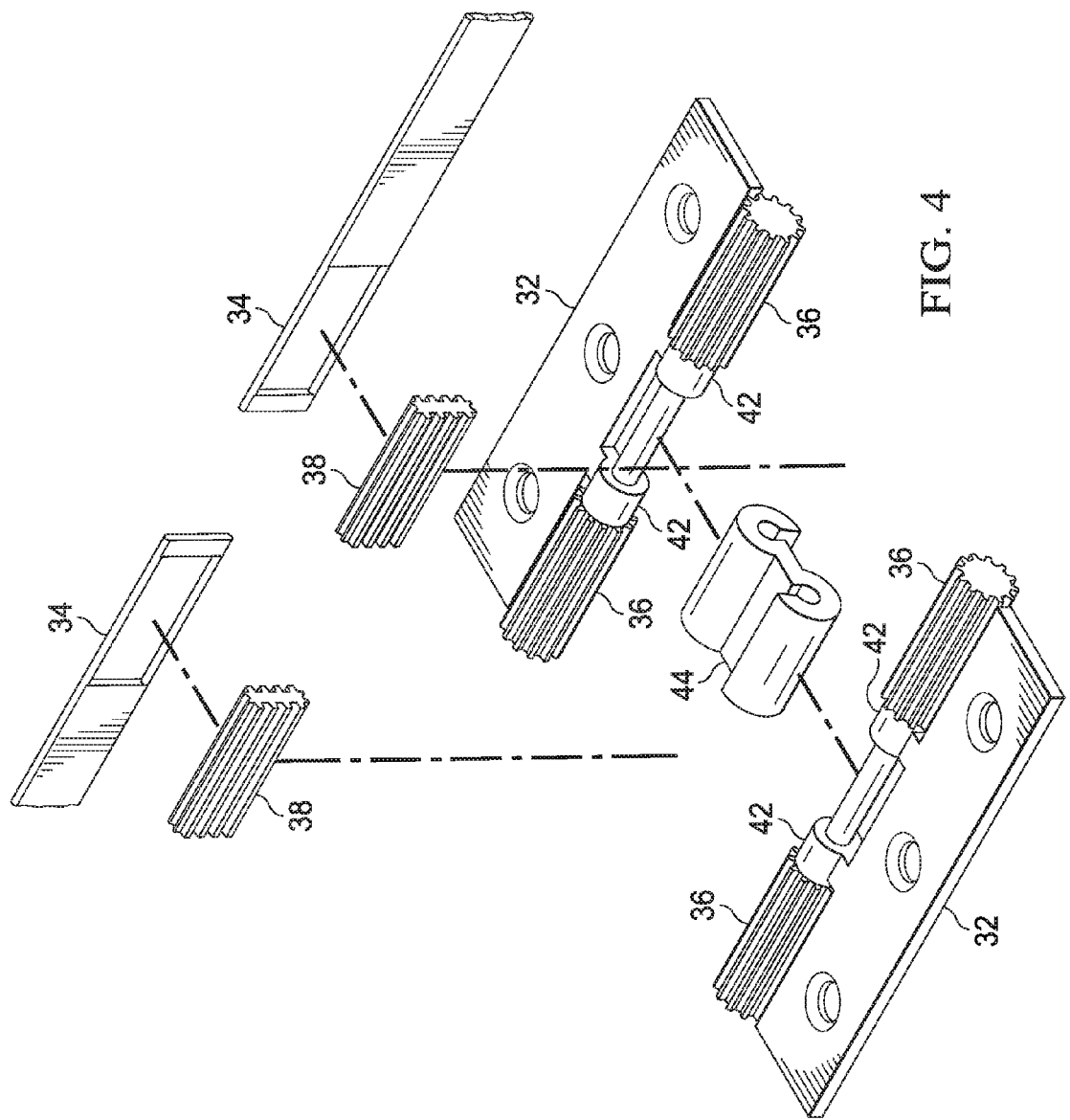
FIG. 4 depicts a blown-up view of a hinge having a rack and pinion rotational support.
Figure 5:
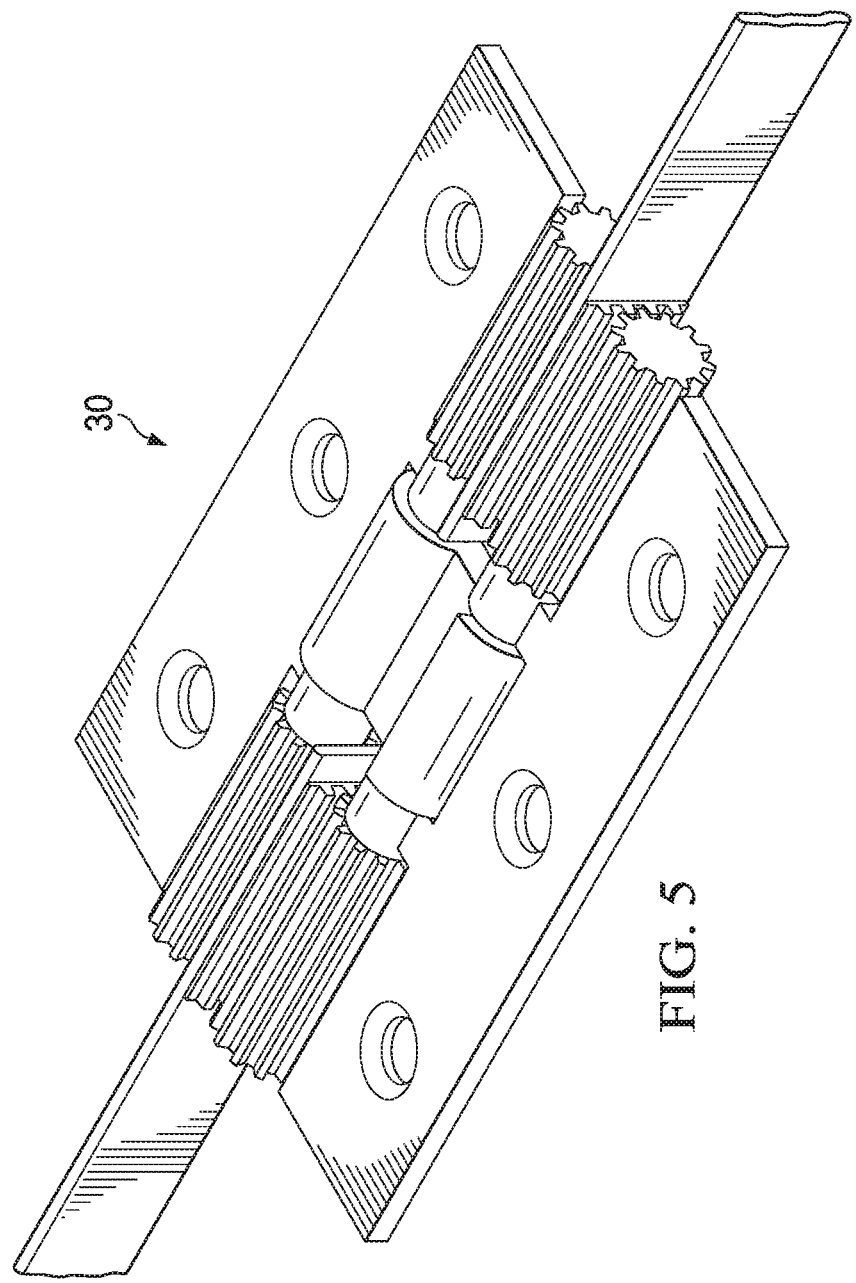
FIG. 5 depicts the hinge of FIG. 4 in an assembled state.

Referring now to FIG. 4, a blown-up view depicts a hinge 30 having a rack 38 and pinion rotational support 32 and 36. Supports 36 are separate pieces that each have a bracket support 42. A bracket 44 snaps onto each bracket support 42 to couple the supports 32 to each other with two axes of rotation. Two racks 38 insert into two opposing sets of pinion gears 36 with each rack 38 coupled to a connection plate 34. In various embodiments, hinges 30 and hinge assemblies 26 may be assembled into complete pieces before coupling to information handling system 10, or may be assembled after supports 32 are couple to information handling system 10. Referring now to FIG. 5, the hinge of FIG. 4 is depicted in an assembled state with the racks 38 interconnected to the pinion gears 36 and one rack 38 coupled to connection plate 34.

Figure 6:
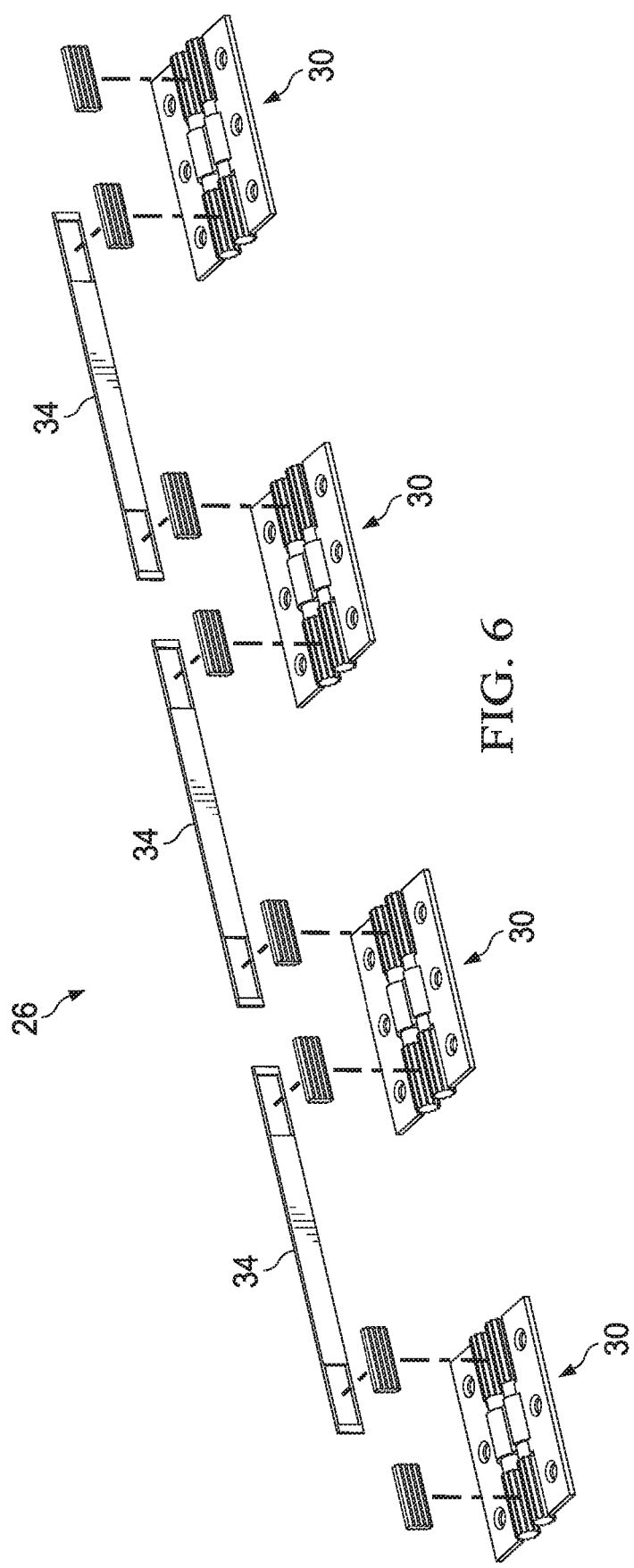
FIG. 6 depicts a blown-up view of a hinge assembly having plural hinges interconnected by plural connection plates.

Referring now to FIG. 6, a blown-up view depicts a hinge assembly 26 having plural hinges interconnected by plural connection plates 34. Each end hinge 30 has an outer rack 38 that may optionally not have a connection plate 34 coupled to it. Connection plates 34 transfer rotational force between hinges by synchronizing movement of racks 38. Coordinated movement of hinges 30 helps reduce torsional force as the housing portions rotate relative to each other, such as where a user places force unevenly at different sides of information handling system 10.

Figure 7:
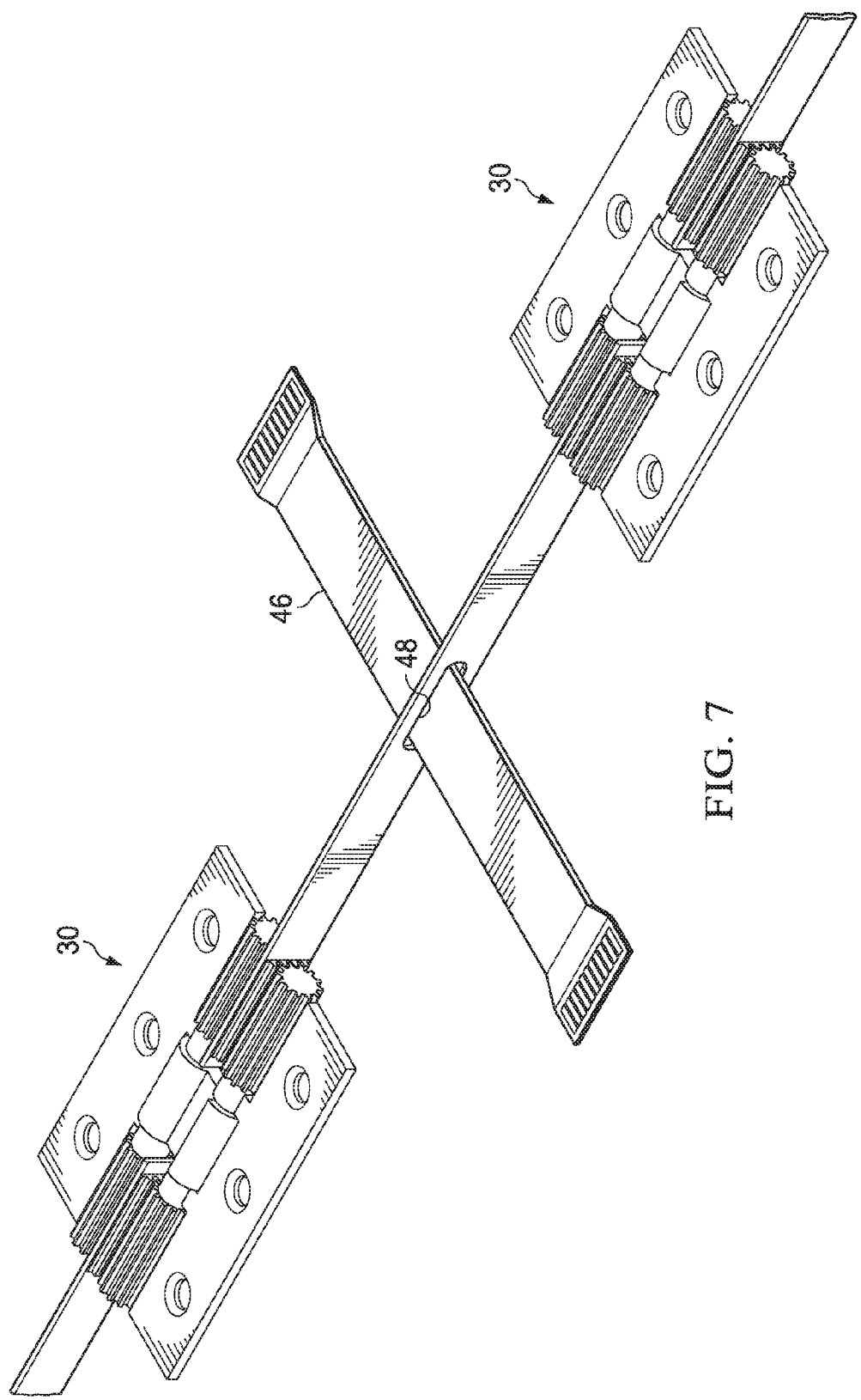
FIG. 7 depicts a hinge assembly having a cable inserted through a cable guide to communicate between the housing portions.

Referring now to FIG. 7 a hinge assembly 26 is depicted having a cable 46 inserted through a cable guide 48 to communicate between the housing portions. In various embodiments, connection plates 34 may be used to route various communication and/or power lines between housing portions.

Although the present invention has been described in detail, it should be understood that various changes, substitutions and alterations can be made hereto without departing from the spirit and scope of the invention as defined by the appended claims.

What is claimed is:

1. A portable information handling system comprising:
   first and second housing portions;
   a processor disposed in one of the housing portions, the processor operable to execute instructions to process information;
   a memory disposed in one of the housing portions, the memory interfaced with the processor, the memory operable to store the information;
   a display disposed in one of the housing portions and interfaced with the processor and memory, the display operable to present the information as visual images;
   a hinge rotationally coupling the first and second housing portions to each other, the hinge having first and second support elements interacting with each other through a third element, the third element extending outward from the first and second housing portions during rotation of the first and second housing portions; and
   a flexible cover enclosing the hinge, the third element pressing against the flexible cover to expand the flexible cover during rotation of the first and second portions.

2. The portable information handling system of claim 1 wherein the hinge further comprises plural sets of first and second support elements coupled together by a single third element extending between the sets of first and second support elements.

3. The portable information handling system of claim 2 further comprising a cable router integrate in the third element and aligned to route cables between the first and second housing portions.

4. The portable information handling system of claim 1 wherein each hinge support element comprises a bracket support and a bracket, the bracket coupling to bracket supports of opposing hinge support elements to provide a rotational element.

5. The portable information handling system of claim 1 wherein the first and second housing portions rotate substantially 360 degrees relative to each other.

6. The portable information handling system of claim 1 further comprising plural hinges coupled to the first and second housing portions, each hinge having opposing third elements interfaced with each other.

7. A method for rotationally coupling a portable information handling system first and second housing portions, the method comprising:
   rotating the first portion relative to the second portion;
   translating the rotating between opposing support elements with a connecting element disposed between the supporting elements;
   moving the connecting element between the support elements in response to the rotating, the connecting element extending outward from the support elements as the first and second housing portions move to a position proximate to each other;
   enclosing the connecting element in a flexible material; and
   stretching the flexible material with force translated by the connecting element extending outward.

8. The method of claim 7 wherein the enclosing the connecting element further comprises enclosing the connecting element in a protective sheath of thermoplastic configured to stretch in response to force applied by the connecting element.

9. The method of claim 8 wherein stretching the flexible material further comprises pressing the connecting element against the flexible material.

10. The method of claim 9 further comprising routing cables to communicate information between the first and second housing portions through the connecting element.

11. The method of claim 7 wherein the first portion comprises a main portion having an integrated keyboard and the second portion comprises a lid having an integrated display.

12. A hinge for rotationally coupling housing portions to each other, the hinge comprising:
   a first support element coupled to a first housing portion;
   a second support element coupled to a second housing portion;
   a connecting element disposed between the first and second support elements, the first and second support elements translating rotational movement of the housing portions into lateral movement of the connecting element; and a flexible sheath enclosing the first and second support elements and the connecting element, the flexible sheath stretching in response to lateral movement of the connecting element.

13. The hinge of claim 12 further comprising:
a bracket support integrated with each of the first and second support elements; and
a bracket coupled to the bracket supports to form the rotational axis of the first and second support elements.

14. The hinge of claim 12 wherein the connecting element extends between plural sets of first and second support elements.

15. The hinge of claim 14 wherein the connecting element includes cable routing structure to route cables between the first and second housing portions.

16. The hinge of claim 15 wherein the first portion comprises an information handling system lid housing portion having an integrated display and the second portion comprises an information handling system main housing portion having an integrated keyboard.

\* \* \* \* \*